H. BEACH.
Curry-Comb.
No. 206,526. Patented July 30, 1878.
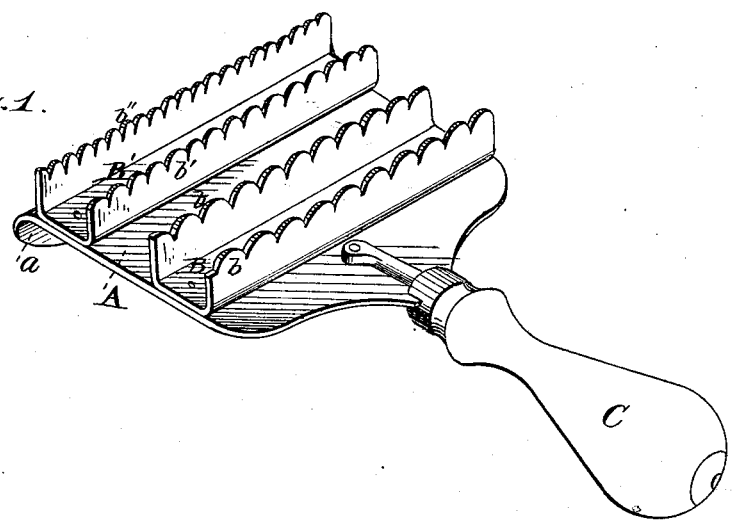
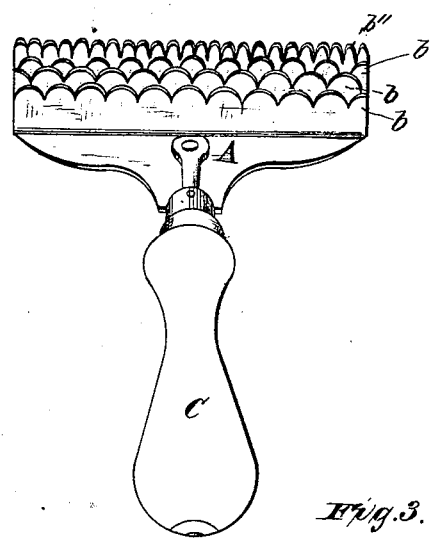
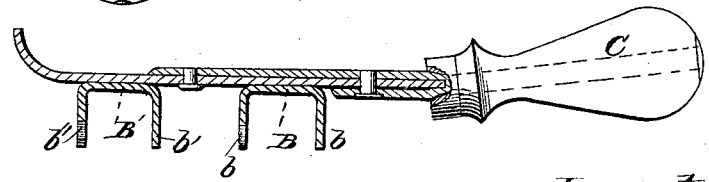
Witnesses:
H. L. Durand
P. McNickle
Inventor
Horace Beach
by L. Deane.
Attorney.

UNITED STATES PATENT OFFICE.

HORACE BEACH, OF PRAIRIE DU CHIEN, WISCONSIN.

IMPROVEMENT IN CURRY-COMBS.

Specification forming part of Letters Patent No. 206,526, dated July 30, 1878; application filed June 3, 1878.

*To all whom it may concern:*

Be it known that I, HORACE BEACH, of Prairie du Chien, county of Crawford, and State of Wisconsin, have invented a new and useful Improvement in the Form and Construction of Curry-Combs, of which the following is a specification:

The invention relates to the form and arrangement of the teeth and scraper on the back side of the curry-comb for cleaning dirt and filth from legs and bodies of animals.

Heretofore curry-combs have been made with sharp and pointed teeth, which were very liable in using to scratch the skin, irritate, and sometimes injure animals, and are wholly unfit to curry their legs, and, owing to the smallness of the teeth, are not effective in removing loose hair, dirt, and dandruff.

This invention consists in the form of the teeth of curry-combs, making them rounded, something in the form of finger-nails of the human hand, all of the teeth with rounded points; also, in the varied size and arrangement of the teeth.

In the accompanying drawings, Figure 1 is a perspective view of the curry-comb taken from a point to the left of the handle. Fig. 2 is a perspective view of the curry-comb in line of the handle. Fig. 3 is a vertical central section of the curry-comb through the handle and back.

The first two rows of teeth ($b\ b$) next the handle C are so arranged that the highest portion of each tooth comes directly opposite the serration or lower portion of the next series of teeth, the third row of teeth ($b'$) being considerably smaller than the first and second rows, and the fourth ($b''$) still smaller than the third row, and points rounded; also, in extending the plate A on which the teeth are fastened sufficiently far to bend the same backward and form a scraper, $a$.

What I claim is—

1. A curry-comb having several series of broad and rounded teeth of the general form of finger-nails, the teeth of the several series varying in size, the series so arranged that the highest portion of the teeth of one series shall be in a line with the depressed portion of the teeth in the series next adjacent, substantially as shown and described.

2. As a new article of manufacture, a curry-comb having on its face several series of broad and rounded teeth, $b\ b\ b'\ b''$, of varying sizes, and arranged as described, and on its back the scraper $a$, substantially as and for the purposes set forth.

HORACE BEACH.

Witnesses:
HORACE BEACH, Jr.,
HENRY C. BEACH.